July 24, 1956 P. SEVIN 2,755,638
AIR REFRIGERATING SYSTEM, IN PARTICULAR
FOR AIRCRAFT COCKPITS
Filed Jan. 26, 1954
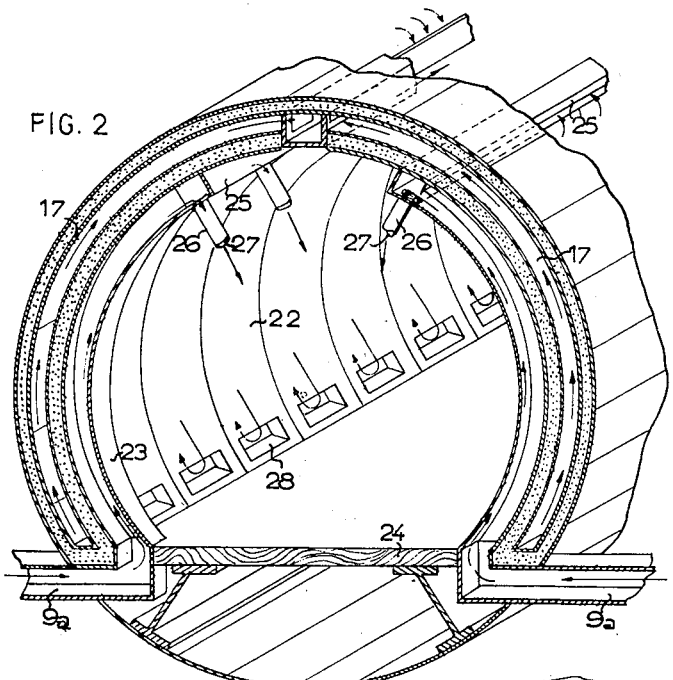
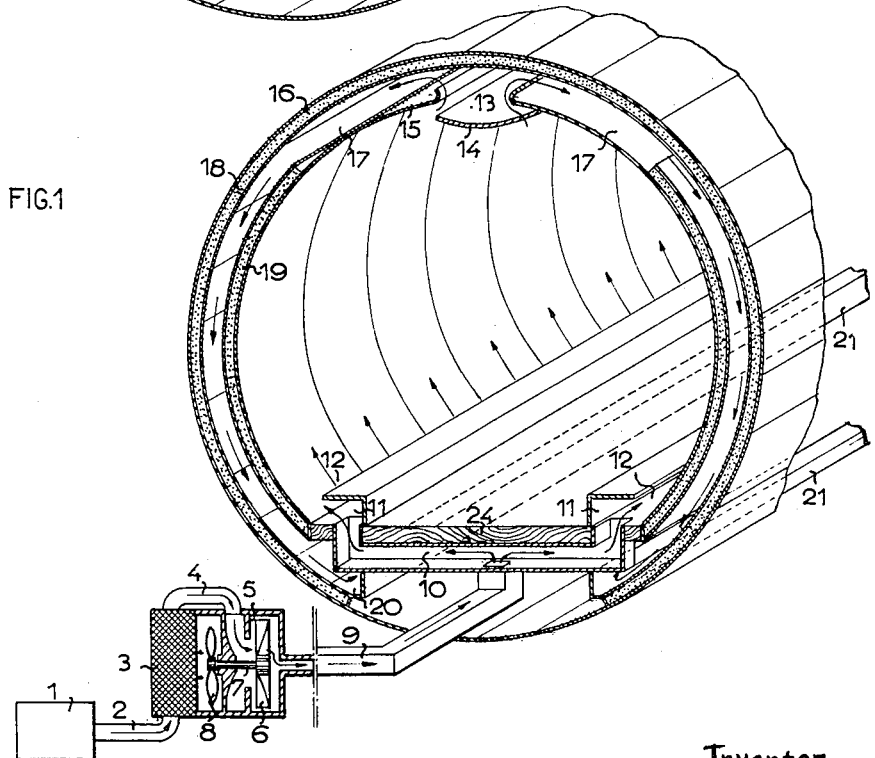
Inventor
Paul Sevin
by Brown & Seward
Attorneys United States Patent Office 2,755,638
Patented July 24, 1956

2,755,638

AIR REFRIGERATING SYSTEM, IN PARTICULAR FOR AIRCRAFT COCKPITS

Paul Sevin, Clamart, France, assignor to Societe Nationale de Constructions Aeronautiques du Sudouest (S. N. C. A. S. O.), Paris, France, a French company Application January 26, 1954, Serial No. 406,261

Claims priority, application France January 30, 1953

3 Claims. (Cl. 62—136)

This invention relates to a refrigerating system using the circulation of cool air for regulating the temperature in an enclosure such as an aircraft cockpit.

The invention will be described in its application to this particular case, in which the problem is very important, especially in view of the recent developments of modern aircraft capable of flying at very high speeds at which the temperature of the "skin" of the fuselage may reach elevated values, in particular under tropical climates.

Now, generally speaking, but especially on board an aircraft, the "unitary cost" of cooled air is comparatively high and, moreover, cooled air is liable to be rapidly re-heated, so that it is advantageous to reduce to a minimum the length of the cool air ducts between the refrigerating apparatus generating the cool air and the space of which the temperature is to be conditioned.

The main object of the invention is therefore to provide a refrigerating system, in particular for aircraft cockpits, wherein cooled air is directly projected into the enclosure to be conditioned, while the evacuation of the air after its utilization in said enclosure takes place through a double-walled mantle surrounding said enclosure as completely as possible.

There is thus obtained a kind of air-jacket continuously circulating between the space to be conditioned and outside, so that it absorbs calories from the hot external wall which are thus prevented from penetrating inside said enclosure.

With such an arrangement, it is obvious that the heat absorbing efficiency of the air jacket will increase, if the rate of flow of the air therein is accelerated.

For this purpose, another object of the invention is to incorporate in the cool air circulating system, preferably upstream the inlet into the enclosure and/or downstream the outlet from the air jacket, air flow accelerating means, which furthermore ensures ventilation of the cockpit.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 1 is a perspective diagrammatic view of an aircraft cockpit provided with an air refrigerating system according to the invention and Fig. 2 shows an alternative embodiment in which the cooled air is projected in the cockpit downwardly.

In the example shown in Fig. 1, the cool air generating means are constituted by a source of air 1 feeding through a duct 2 a radiator 3, which ensures a strong refrigeration of said air, as exposed hereunder.

From radiator 3, the air thus refrigerated is brought through a duct 4 into the expansion chamber 5 of a turbine 6 in which its pressure is suddenly reduced, which further decreases its temperature. The shaft 7 of turbine 6 carries a fan 8 which is used to suck air from outside through radiator 3.

The above described generating means send cooled air under a slight pressure through a duct 9 which is, according to the invention, as short as possible.

In the embodiment shown in Fig. 1, two ducts 10 lead from duct 9, each to one of two distribution slots 12 located along the bottom of the inner space of a cockpit. In the example shown, said slots are formed between the inner wall 15 of the cockpit and bracket-shaped longitudinal members 11. After its utilization in the inner space of the cockpit, the air is evacuated along the top line of said cockpit through a longitudinal slot 13 formed in the inner wall 15 and preferably protected, as shown, by a longitudinally extending masking member 14 from which it flows between the inner wall 15 and the outer wall 16 of the double-walled envelope, which, according to the invention, surrounds the inner space of the cockpit. The outer wall 16 is preferably provided with a continuous thermal insulating mantle 18. The inner wall 15 is separated from the inner space by a thermal insulation 19 only from a certain level above which the air circulating in the jacket 17 is substantially at the same temperature as the air in the inner space. On the contrary, from the above-mentioned level downwards, the air flowing in jacket 17 has already absorbed a number of calories from outside, so that the presence of the thermal insulation 19 becomes necessary. The air, after having been used in the air jacket 17, according to the invention, to protect the inner space from the heating action of outside temperature, is evacuated through a longitudinal duct 20 to be expelled out at 21. Preferably, to accelerate the circulation in the insulating jacket 17, the outlet 21 is located outside the fuselage in an area of negative pressure created by the displacement of the aircraft. However, if necessary, other suction means such as a fan may be provided.

The above described arrangement permits not only to refrigerate the inner space by direct projection of cool air into said space, but also to protect the same against heating from outside by circulating a heat insulating mass of air around said inner space.

In the particular embodiment described above with reference to Fig. 1, the length of the cool air path to its slot of prejection 12 into the inner space is particularly short.

Now, in certain cases, it may be preferred to project the cool air downwardly even if, for this purpose, the path of the cool air has to be slightly lengthened. Such an alternative has been shown in Fig. 2 in which additional circular ducts 23 are provided to bring the cool air from its inlet 9a under the floor 24, to longitudinal distribution ducts 25 extending near the top of the inner space 22 and provided with spaced nozzles 26 having preferably orientable heads 27. The cool air thus projected downwards into the cockpit is evacuated, after having been utilized, through a plurality of slots 28 extending at a short distance above floor 24 along the sides of the same. Slots 28 lead, as previously, the utilized cool air into the double-walled envelope or air-jacket 17 wherein it ensures, as in the embodiment of Fig. 1, an efficient absorption of the heat accumulated on the skin 16 of the fuselage.

It is to be noted that, in this alternative, the cool air flows through the cockpit in a more natural way, i. e. downwardly, while it circulates upwardly in the air jacket 17 when it has been re-heated in the inner space 22, which is also a more natural mode of circulation than in Fig. 1.

What is claimed is:

1. A refrigerating system for use in an aircraft cabin enclosed by an outer wall and by an inner wall having side, top and bottom portions spaced from said outer wall to define therewith an air space coextensive with at least a major part of said top and side portions, comprising means for generating cooling air, means for conducting said cooling air into the interior of said cabin at points vertically spaced in one direction from the horizontal median plane of said cabin, outlet passageways passing through said inner wall and formed at points vertically spaced in the opposite direction from said median plane and exhaust channel means leading from a point of said air space peripherally spaced from said passageways to a discharge orifice in said outer wall, the arrangement being such that the cooling air conducted into said cabin discharges therefrom through said passageways and is caused to flow through said air space to said exhaust channel means in a direction substantially opposite to that in which the cooling air is flowing from its points of admission into the cabin to the said outlet passages.

2. A refrigerating system according to claim 1, further comprising means to accelerate the speed of flow of the cooling air through said air space.

3. A refrigerating system according to claim 1, in which said cool air generating means are constituted, in combination, by a source of air, a radiator fed from said source, a turbine having an expansion chamber, means to feed said expansion chamber with refrigerated air from said radiator and a fan rotatively fast with said turbine to suck air from outside through said radiator.

References Cited in the file of this patent

UNITED STATES PATENTS

| | | |
|---|---|---|
| 2,210,960 | St. Pierre | Aug. 13, 1940 |
| 2,427,698 | Arnhym | Sept. 23, 1947 |
| 2,540,331 | Hlavaty | Feb. 6, 1951 |
| 2,581,964 | Mayer | Jan. 8, 1952 |